US012780678B2

(12) United States Patent
Paturi et al.

(10) Patent No.: US 12,780,678 B2
(45) Date of Patent: Nov. 3, 2026

(54) AQUEOUS SOLUTIONS, METHODS OF MANUFACTURING THE SAME AND USES THEREOF

(71) Applicant: Turun yliopisto, Turun yliopisto (FI)

(72) Inventors: Petriina Paturi, Turun yliopisto (FI); Ville Paasonen, Turun yliopisto (FI); Hannu Huhtinen, Turun yliopisto (FI); Ilari Angervo, Turun yliopisto (FI)

(73) Assignee: Turun yliopisto, Turun yliopisto (FI)

( * ) Notice: Subject to any disclaimer, the term of this patent is extended or adjusted under 35 U.S.C. 154(b) by 0 days.

(21) Appl. No.: 18/879,819

(22) PCT Filed: Jun. 28, 2023

(86) PCT No.: PCT/FI2023/050399
§ 371 (c)(1),
(2) Date: Dec. 30, 2024

(87) PCT Pub. No.: WO2024/003454
PCT Pub. Date: Jan. 4, 2024

(65) Prior Publication Data

US 2025/0333324 A1 Oct. 30, 2025

(30) Foreign Application Priority Data

Jun. 30, 2022 (FI) ..................................... 20225600

(51) Int. Cl.
*C01F 17/32* (2020.01)
*C09D 1/00* (2006.01)
*C09D 7/80* (2018.01)

(52) U.S. Cl.
CPC ................ *C01F 17/32* (2020.01); *C09D 1/00* (2013.01); *C09D 7/80* (2018.01); *C01P 2002/50* (2013.01);
(Continued)

(58) Field of Classification Search
None
See application file for complete search history.

(56) References Cited

U.S. PATENT DOCUMENTS

| | | | | |
|---|---|---|---|---|
| 6,245,115 | B1 * | 6/2001 | Appel .................. | C07D 213/38 510/303 |
| 2006/0050549 | A1 | 3/2006 | Adachi et al. | |
| 2007/0031312 | A1 | 2/2007 | Payne et al. | |

FOREIGN PATENT DOCUMENTS

| | | | |
|---|---|---|---|
| CN | 111871410 | A | 11/2020 |
| CN | 112877676 | A | 6/2021 |

(Continued)

OTHER PUBLICATIONS

Das et al: Large agnetocaloric effect in Ln0.5Ca0.5MnO3 (Ln=Gd, DY) compounds: Conseqence of magnetic recursor effect of rare earth ions. Journal of Magnetism and Magnetic Materials, Sep. 19, 20214, vol. 374, pp. 707-710.

(Continued)

*Primary Examiner* — Stefanie J Cohen
(74) *Attorney, Agent, or Firm* — Laine IP Oy

(57) ABSTRACT

The present invention relates to aqueous solutions, methods of manufacturing the same and uses thereof. The aqueous solution comprises an alkaline earth metal added in the form of a water-soluble salt, manganese at least mainly present as a citrate complex of manganese having an oxidation state of +3 or +4, and optionally a lanthanide present in the form of a water soluble complex. The aqueous precursor solutions contain metals at appropriate stoichiometric ratios for producing films of complex inorganic metal oxides by Chemical Solution Deposition (CSD). The complex inorganic metal oxides can be used as memristor materials, and generally in microelectronic, magnetic, and spintronic
(Continued)

devices, in solid oxide fuel cells, in magnetic refrigeration, and in the fields of biomedicine, and as catalysts.

22 Claims, 6 Drawing Sheets

(52) U.S. Cl.
CPC ...... *C01P 2002/72* (2013.01); *C01P 2004/03* (2013.01)

(56) References Cited

FOREIGN PATENT DOCUMENTS

| | | | |
|---|---|---|---|
| EP | 0650927 | A1 | 5/1995 |
| KR | 20140074029 | A | 6/2014 |
| TW | 200742041 | A | 11/2007 |
| WO | WO2021152215 | A1 | 8/2021 |

OTHER PUBLICATIONS

Dasgupta et al: Experimental and theoretical demonstration of negative magnetization induced by particle size reduction in nano-form Gd_I—xCa_xMn0_3. arxiv.org, Cornell University Library, Apr. 11, 2021, pp. 2-9.
Lohnert et al: Evaluation of soft chemistry methods to synthesize Gd-doped CaMn03-[delta]with improved thermoelectric properties. Materials Science and Engineering: B, Jul. 7, 2017, vol. 223, pp. 185-193.
Sagapariya et al: Transport properties and electroresistance of manganite based heterostructure. Ceramics International, Jun. 20, 2019, vol. 45, No. 15, pp. 19456-19466.
Schulman et al: Metastable ferromagnetic flux closure-type domains in strain relaxed Gd0.1Ca0.9Mn03 thin films. Journal of Physics: Condensed Matter, Institute of Physics Publishing, Oct. 20, 2020, vol. 33, No. 3, p. 35803.

* cited by examiner (a)

(b)

AQUEOUS SOLUTIONS, METHODS OF MANUFACTURING THE SAME AND USES THEREOF

FIELD OF THE INVENTION

The present invention relates to aqueous solutions of metal compounds. In particular, the invention concerns novel aqueous solutions of water-soluble metal compounds, such as metal salts or metal complexes, which can be used, e.g., for manufacturing metal oxide films by liquid phase deposition. The present invention also concerns methods of manufacturing aqueous solutions containing dissolved, water-soluble metal compounds and metal complexes, and the use of the aqueous solutions.

BACKGROUND

WO 2121/152215 A1 discloses the production of memristor materials having the formula $Gd_{1-x}Ca_xMnO_3$ (or abbreviated "GCMO"), wherein x is a value greater than 0 and smaller than 1, from starting materials which are formed by pulsed laser deposition of specific solid state materials, viz. gadolinium (III) oxide, calcium carbonate and manganese (IV) oxide. In pulsed laser deposition, typically abbreviated "PLD", the starting material is vaporized by a high-power pulsed laser beam that strikes a target in a vacuum chamber. In the chamber, vapours of the target will deposit as a thin film on a substrate, such as a silicon wafer facing the target. PLD is useful for the manufacture of high-quality thin films. The PLD technology is, however, energy-intensive and there are some constraints on its large-scale application, such as on its use on an industrial level.

Thus, there is a need for methods for producing GCMO and similar complex metal oxides, in particular Perovskite-manganite lanthanide oxides useful, for example, as thin films that can be easily upscaled depending on wafer size for industrial production of, for example, GCMO films.

SUMMARY

The present invention aims at eliminating at least a part of the problems of the art by providing aqueous solutions of metal compounds and complexes that are useful as precursors of metal oxide films. The films can be produced by depositing layers from the solution by chemical solution deposition and by thermally curing the layers.

In a first aspect, the present description relates to an aqueous solution which comprises an alkaline earth metal added in the form of a water-soluble salt, manganese at least mainly present as Mn(III) and/or Mn(IV) complexes, exhibiting a molality of 0.1 to 5 with respect to the alkaline earth metal; and formulated into a precursor solution for use in chemical solution deposition of a thin film of a material having Formula I $$R_{1-x}A_xMnO_3 \qquad \text{I}$$

wherein

R stands for a lanthanide,

A stands for an alkaline earth metal, and x has a value in the range from 0.5 to 1.0, said material being crystalline.

Optionally the solution comprises a lanthanide present in the form of a water soluble complex.

In a second aspect, the present description relates to a method of preparing an aqueous solution containing an alkaline earth metal, manganese and optionally an element selected from the lanthanides. The method comprises the steps of providing a first aqueous solution of a water-soluble salt of an alkaline earth metal, and further providing at least one of the following, viz. a second aqueous solution of manganese at least mainly present as a citrate complex of manganese having an oxidation state of +3 and/or +4, and optionally a water soluble complex of a lanthanide, and a third aqueous solution of manganese present as a citrate complex of manganese having an oxidation state of +3 and/or +4, and a water soluble complex of a lanthanide. The first and at least one of the second and third aqueous solutions are then mixed at a predetermined ratio to provide the aqueous precursor solution.

In a third aspect, the present description relates to the use of an aqueous solution as an aqueous precursor solution for preparing a thin film, in particular epitaxial thin films, by chemical solution deposition.

In a fourth aspect, the present description relates to the preparation of an epitaxial thin film having Formula I $$R_{1-x}A_xMnO_3 \qquad \text{I}$$

wherein

R stands for Eu, Gd, Tb, Sm, Pr, La and Nd,

A stands for an alkaline earth metal, and x has a value in the range from 0.5-1.0, by deposition upon a substrate in order to provide a memristor.

In a fifth aspect, the present description relates to a method for manufacturing a thin film on a substrate, comprising providing the substrate;

rendering the substrate hydrophilic; and preparing the thin film by chemical solution deposition of the aqueous solution as described herein.

More specifically, the present invention is characterized by what is stated in the independent claims.

Considerable advantages are obtained by the invention.

Thus, by the present invention, aqueous solutions of metals can be provided which contain the metals at appropriate stoichiometric ratios for the solutions to be capable of use in Chemical Solution Deposition (CSD) for producing inorganic films.

The water-based chemical solution deposition method can easily be scaled to wafer size, allowing for manufacture of industrial size metal oxide films containing a lanthanide, alkaline earth metal and at least one of manganese or similar materials such as metal oxide films of gadolinium, calcium and manganese (also abbreviated GCMO films), and lanthanum, calcium and manganese (abbreviated LCMO films).

High solubility of the metal compounds and complexes is achieved, which makes it possible to reach so high a concentration of the metals that film thicknesses in the range of, for example, 10 to 100 nm can readily be obtained by CSD. Citrate can be the only complexing agent present in the solution, therefore allowing the omission of other complexing agents such as EDTA, NTA or DTPA, which contributes beneficially to the presence of free metal compounds in the solution. The amount of citrate ligands is preferably adjusted in such a manner that there are no free ligands. The absence of EDTA, NTA, DTPA and similar complexing agents also means that the aqueous solution does not contain large molecules, and thus thinner good quality films can be manufactured with the present aqueous solution than with known solutions. The present aqueous solution does thus not need to use any sol-gel method, which provides a further advantage in that the manufactured film does then not contain significant amounts of organic material, the organic material requiring that it is burned before the film is final. A still further advantage is that the present aqueous solution does not require using any toxic materials. Further, the solutions provided exhibit properties of viscosity and wetting that make them suitable for application on a surface or substrate. Examples of useful methods include dip coating, aerosol deposition, inkjet printing, roll-on-roll transfer and spin-coating.

All other elements present in the solution, viz. H, C, N, and (partially) O, can be removed by heat treatment of the deposited layer. Therefore, films of high purity are obtained by heating and curing (annealing) of films deposited by CSD as herein discussed.

Additionally, the present precursor solutions are water-based, whereby the use of environmentally detrimental solvents or compounds, in particular organic solvents or complexing agents such as EDTA or NTA, can be avoided. The present solution will leave no residues of any excess elements of the solvents or reagents used in the preparation of the precursor solutions but only the desired complex metal oxides. Further, the present technology allows for the use of non-toxic metal-organic compounds.

Further features of preferred embodiments of the present technology will be discussed more closely in the following detailed description.

DETAILED DESCRIPTION OF EMBODIMENTS

Definitions

Figure 1:
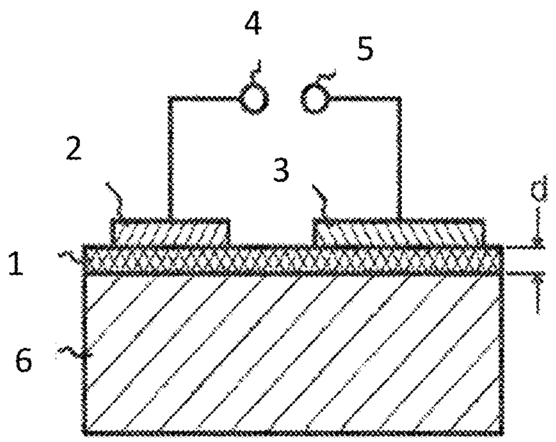
FIG. 1 shows a schematic cross-section of a memristor of a planar type.

Unless otherwise stated herein or clear from the context, any percentages referred to herein are expressed as percent by weight based on a total weight of the respective composition.

In the present context, "alkaline earth metal" has its conventional meaning. In particular, alkaline earth metal stands for the elements beryllium (Be), calcium (Ca), magnesium (Mg), barium (Ba) and strontium (Sr) and combinations thereof.

In the present context, the term "manganese present as a citrate complex of manganese having an oxidation state of +3 and/or +4" stands in particular for Mn(III) citrate complexes, Mn(IV) citrate complexes, and combinations thereof.

In the present context, "lanthanide", stands for an element having an atomic number from 57 to 71, i.e. from lanthanum to lutetium in the Periodic table of elements. These metallic elements have the following symbols: La, Ce, Pr, Nd, Pm, Sm, Eu, Gd, Tb, Dy, Ho, Er, Tm, Yb and Lu.

Embodiments of the present technology concern "complex" metal oxides. In particular, such complex metal oxides typically comprise oxides of gadolinium or other lanthanides, calcium or other alkaline earth metals, and manganese (including similar metals). Preferably, the present metal oxides are perovskite manganite; in one embodiment they have a orthogonal perovskite structure.

As will appear, the complex metal oxides can be used as "memristive materials".

In the present context, the term "memristor", stands for an electronic component the current-conducting properties of which depends on the electric conditions to which it has previously been subjected.

These memristive materials can be used for example in processing devices related to neuromorphic computing, distributed computing, edge computing or memory devices as well as in other applications and uses.

"Chemical Solution Deposition" stands for a coating or deposition method in which the coating is formed on a substrate from the corresponding components of the solution. In embodiments of the present technology, solutions of soluble compounds or complexes of lanthanides, alkaline earth metals and Mn are deposited on substrates which allow for epitaxial growth of the corresponding complex metal oxides upon the substrates.

The solution is referred to as a chemical "precursor solution", and it is typically used for creating a film on the substrate.

EMBODIMENTS

One embodiment of the present technology provides an aqueous solution, which comprises

- an alkaline earth metal added in the form of a water-soluble salt,
- manganese at least mainly present as a manganese citrate complex, and
- optionally a lanthanide present in the form of a water soluble complex.

It would appear that the metal compounds or complexes are primarily, if not completely, present in the aqueous phase in dissolved or solvated form, so as to form a clear solution of the metal compounds or complexes in water, although it cannot be excluded than minor parts of the metals are present in a dispersed phase in water.

In one embodiment, the present aqueous solutions comprise generally, calculated from the total weight of the solution:

- 0.5 to 40%, in particular 1 to 25%, or 1.5 to 20%, or 1.7 to 15%, in particular 2 to 10% or 2 to 7.5% or 2 to 5%, by weight of the water soluble alkaline earth metal salt, 0.5 to 20%, in particular 1 to 15%, or 1.5 to 12.5%, or 2 to 10%, or 2.5 to 7.5% or 3 to 5%, by weight of manganese, calculated as $MnO_2$, and 0.1 to 15%, in particular 0.2 to 10%, or 0.3 to 7.5%, or 0.4 to 6%, for example 0.5 to 5% or 0.5 to 4.5%, by weight of a lanthanide, calculated as the corresponding oxide.

In addition, the present aqueous solutions comprise typically up to 50%, in particular about 1 to 40%, or 5 to 35% or 10 to 30%, preferably 15 to 25%, or 17.5 to 22.5%, by weight of citric acid, calculated from the total weight of the solution.

In one specific embodiment, the present aqueous solutions comprise, calculated from the total weight of the solution:

1.5 to 15%, for example 2 to 10%, by weight of the water soluble alkaline earth metal salt selected from calcium, barium or strontium, 1 to 15%, for example 2 to 10%, by weight of manganese, calculated as $MnO_2$, 0.2 to 10%, for example 0.3 to 7.5%, by weight of a lanthanide, calculated as the corresponding oxide, said lanthanide being selected from Eu, Gd, Tb, Sm, Pr, La and Nd, in particular Gd, Eu, La or Pr, and 1 to 40%, for example 10 to 30%, by weight of citric acid.

For preparing thin films having Formula I (cf. below), in which x has a value of about 0.7 to 0.8, in particular about 0.75, solutions of the above kind are preferably used, which contain 0.1 to 15%, in particular 1 to 10%, or 1.5 to 7.5%, or 1.8 to 6%, for example 2 to 5% by weight of a lanthanide, calculated as the corresponding oxide.

In one embodiment, at least 99 wt-%, in particular 99.5 to 100 wt-%, or 99.9 wt-% or more, of the metals are present as metal compounds or complexes, which are present in dissolved or solvated form.

In one embodiment, the aqueous solution contains an alkaline earth metal salt selected from the group of calcium, barium and strontium and combinations thereof. In particular, the aqueous solution contains calcium in the form of a water-soluble salt, such as calcium nitrate, in particular calcium nitrate hydrate, or calcium acetate. Calcium is added as a salt and dissolved into water. Similarly, strontium or barium can be added as a water-soluble salt and dissolved in water.

Complexes of the alkaline earth metal can also be used as a starting material of the alkaline earth metal instead of, or in addition to, water soluble salts; examples included complexes formed of the alkaline earth metals with EDTA, NTA and DTPA, although preferably EDTA, NTA and DTPA are not used.

In one embodiment, manganese is present mainly as a citrate complex of Mn(III) or Mn(IV) or combinations thereof, exhibiting citrate ligands (also referred to as "citrato" ligands) bonded to the Mn cation. In one specific embodiment, an aqueous solution is provided which comprises manganese in the form of an Mn(III) and/or Mn(IV) citrate complex having, on an average, one citrato ligand per Mn cation. Typically, the manganese citrate complex(es) render(s) the aqueous solution a dark colour.

In addition to manganese, the present technology is suitable for processing other metals that have similar chemical properties.

In one embodiment, the aqueous solution comprises a lanthanide that is added in the form of water soluble salt, such as a nitrate, a hydroxide or a complex, in particular in the form of a citrate complex or a complex formed by another complexing agent such as EDTA, NTA or DTPA, although preferably EDTA, NTA and DTPA are not used.

In one particular embodiment, the lanthanide complexed with citrato ligand(s) is water-soluble. In one embodiment, the lanthanide is present in the form of the trivalent lanthanide (oxidation state: +3), although at least some of the lanthanides can also be present as citrate complexes of the bivalent or tetravalent lanthanide ions.

In addition to citrate complexes of the lanthanide, it is possible to use other complexes as well as water soluble salts of the lanthanide(s).

In one embodiment, the lanthanide is selected from the group consisting of La, Ce, Pr, Nd, Sm, Eu, Gd, Tb, Dy, Ho, Er, Tm, Yb and Lu, in particular Eu, Gd, Tb, Sm, Pr, La and Nd.

In one preferred embodiment, the lanthanide is Gd, in particular Gd present in the form of a citrate complex of the trivalent metal, said Gd being used as a starting material for example in the form of an oxide ($Gd_2O_3$).

In another preferred embodiment, the lanthanide is La or Eu or Tb or Sm or Pr or Nd.

The aqueous solution according to the present technology can be formulated into a precursor solution for use in chemical solution deposition of a thin film of a material having the formula $$R_{1-x}A_xMnO_3 \qquad I$$

wherein

R stands for a lanthanide, such as Eu, Gd, Tb, Sm, Pr, La or Nd,

A stands for an alkaline earth metal, and x has a value in the range from 0.5 to 1.0, for example 0.55-1.0, 0.6-1.0, 0.65-1.0, 0.7-1.0 or 0.75-1.0; or 0.5 to 0.99, such as 0.55-0.99, 0.6-0.99, 0.65-0.99, 0.7-0.99 or 0.75-0.99; preferably x has a value in the range from 0.5 to 0.95, such as 0.55-0.95, 0.6-0.95, 0.65-0.95, 0.7-0.95 or 0.75 to 0.95 or 0.75 to 0.90.

In one embodiment, in formula I, x has a value of 0.6 to 0.95, or 0.75-0.90.

The aqueous solution exhibits a molality of 0.1 to 5 with respect to the alkaline earth metal. According to an embodiment, the molality is 0.2 to 4, such as 0.3. to 3.5, or 0.5 to 3, in particular about 0.6 to 2, or 0.7 to 1.5 or about 1±0.25 with respect to the alkaline earth metal, such as calcium.

A composition as mentioned above and a molality in the above ranges will contribute to the forming of epitaxial thin films having thickness of at least 10 nm when the aqueous solution is deposited upon a substrate by Chemical Solution Deposition and then cured, in particular at increased temperature, to remove elements such as H, C, N, and (partially) O. The citrate ions present will complex to the metal cations and, in one embodiment, the aqueous solution is free or essentially free from free citrato ligands.

Generally, the water content of the aqueous solution is in the range of about 10 to 99% by mass, typically about 15 to 95%, such as 10 to 90%, for example 20 to 85% or 25 to 85% or 30 to 80% or 40 to 80% or 50 to 75% by mass, calculated from the total weight of the solution. The solids content of the solution is 5 to 85%, such as 10 to 90%, for example 15 to 80% or 15 to 75% or 20 to 70% or 20 to 60% or 25 to 50% by mass, calculated from the total weight of the solution.

In one embodiment, suitable for, e.g., producing by CSD, films having a thickness of about 10 to 200 nm, 25 to 175 nm, 50 to 150 nm, or 75 to 125 nm, such as 100 nm±10 nm, the aqueous solution has a water content of 40 to 80%, in particular 50 to 75% by mass. Thus, the solids content of the solution is generally about 20 to 60%, in particular 25 to 50% by weight, calculated from the total weight of the solution.

In one embodiment, the aqueous solution has a pH in the basic range, in particular of 8 or more, e.g. 8 to 13 or 9 to 12. A pH of 8 or more will contribute to stabilization of the citrate complexes.

In one embodiment, the present technology comprises a method for preparing an aqueous solution containing an alkaline earth metal, manganese and optionally an element selected from the lanthanides.

In the method, the aqueous solution can be prepared by the steps of

- providing a first aqueous solution of a water-soluble salt of an alkaline earth metal;
- providing at least one of the following:
  - a second aqueous solution of a manganese citrate complex and
  - a third aqueous solution of a manganese citrato complex and of a water soluble complex of a lanthanide; and
- mixing the first and at least one of the second and third aqueous solutions at a predetermined ratio to provide said aqueous solution.

In the first step, a first aqueous solution of an alkaline metal is provided, typically as a separate stock solution. The solution is formed by dissolving a suitable source of calcium, in particular a water-soluble calcium compound, into water to provide an aqueous calcium-containing solution. In one embodiment, the calcium source is selected from calcium nitrate and calcium acetate. In another embodiment, the calcium source is calcium nitrate and/or calcium acetate. Selecting calcium acetate or a mixture of calcium acetate and calcium nitrate may be preferred if decomposition of the nitrate is too intense in subsequent steps.

In a particular embodiment, calcium nitrate hydrate is used; it has been found that calcium nitrate does not interfere with the wetting properties of the final precursor solutions. Furthermore, the nitrate anion decomposes into nitrogen dioxide and oxygen at temperatures well below 900° C., such as at temperatures of up to 750° C. This means that after heat treatment, any films formed from precursor solutions containing calcium in the form of dissolved calcium nitrate (or calcium nitrate hydrate) will be free from nitrogen impurities. Also the citrate will burn off during the heat treatment, leaving—in practice—very low levels of impurities, or essentially no residues.

The concentration of calcium in the stock solution is typically in the range of 0.5 to 10 M, in particular about 1 to 8 M or 1.5 to 7 or 2 to 6.5, such as 2.5 to 6 M.

In one embodiment, the stock solution of the alkaline earth metal (i.e. the first solution) is mixed with at least one of the second and the third solutions at predetermined volume ratio corresponding to the intended stoichiometry of the complex oxide. For example, for preparing a precursor solution for a complex oxide of formula $R_{1-x}A_xMnO_3$, in which A stands for alkaline earth metal and R for lanthanide and x is a value less than 1, the first and the third aqueous solutions and optionally the second aqueous solutions are mixed at a ratio which gives the predetermined content of lanthanide in the precursor solution.

The order of mixing of the first, second and third solutions can vary.

In one embodiment, the first aqueous solution is mixed with a predetermined amount of the second aqueous solution and then with optionally a third aqueous solution.

In one embodiment, the first aqueous solution is mixed with a predetermined amount of the third aqueous solution and then with the second aqueous solution.

In still a further embodiment, the second and third solutions are first mixed together at a predetermined ratio, and then the thus obtained solution is mixed with the first solution. The second and third solutions are mixed together at a ratio for example calculated based on the aimed ratio of lanthanide and manganese in a metal oxide film produced from the final aqueous solution.

Generally, the mixing ratio (volume/volume) of the first solution to the second or third solutions or to a combination of the second and third solutions varies in the range of 1:99 to 75:25, such as 5:95 to 50:50, in particular 10:90 to 30:70, for example 12:88 to 25:75 or 15:85 to 20:80.

The mixing ratio (volume/volume) of the second to third solutions varies in the range of 0:100 to 100:0, in particular 1:99 to 99:1, such as 5 to 95 to 95:5, in particular 10:90 to 90:10 or 20:80 to 80:20, for example 30:70 to 70:30.

In one embodiment, for providing a soluble lanthanide component for the third solution, the method comprises the steps of

- dissolving citric acid in water to form an aqueous solution; and
- adding a lanthanide oxide into the aqueous solution of the citric acid to form a water soluble complex of the said lanthanide.

In one specific embodiment, the method for preparing a dissolved lanthanide component comprises the steps of

- providing a lanthanide oxide;
- dissolving a molar excess, in particular a 2.5- to 5-fold molar excess, of citric acid, compared to the lanthanide oxide into the aqueous solution;
- contacting the lanthanide oxide with citric acid until at least essentially all lanthanide oxide has dissolved; and
- increasing the pH of the aqueous solution in order to form a stable citrato complex of the lanthanide.

The lanthanide is typically selected from the group of La, Ce, Pr, Nd, Sm, Eu, Gd, Tb, Dy, Ho, Er, Tm, Yb and Lu and combinations thereof, in particular Eu, Gd, Tb, Sm, Pr, La and Nd and combinations thereof, such as Eu, Gd, Tb, Sm, Pr, La and Nd and combinations thereof. In one embodiment, the lanthanide is Gd.

In one embodiment, the method comprises preparing a dissolved manganese component for the second and/or third solution by the steps of

- adding $MnO_2$ into an aqueous solution of citric acid;
- reducing Mn into Mn(II) in the aqueous citric acid solution; and
- raising the pH of the aqueous solution to a value of at least 8 to form Mn(III) or Mn(IV) citrate or a combination thereof.

Manganese (III) or manganese (IV) can be reduced into manganese (II) by hydrogen peroxide acting as a mild reducing agent. Hydrogen peroxide can be added as an aqueous solution and mixed with the aqueous solution of citric acid and $MnO_2$. After the reduction of the Mn(IV) (and Mn(III)) into Mn(II), an aqueous solution of manganese citrate is formed.

The manganese component of the complex can, in a following stage, be oxidized into an oxidation state greater than +2 for example by the addition of ammonia. Thus, ammonia can be added to an aqueous solution containing Mn(II) citrate to increase pH and thereby effect deprotonation of citric acid and to oxidize manganese to Mn(III) or Mn(IV) or a combination thereof.

By increasing the pH of the aqueous manganese citrate solution, for example by adding ammonia, to 8 or more, complexation of manganese with the citrate ligands will be effected.

In one embodiment, for example for forming the second aqueous solution, $MnO_2$ is added to an aqueous solution obtained by adding citric acid into water.

In another embodiment, for example for forming a third aqueous solution, $MnO_2$ is added to an aqueous solution containing lanthanide citrate. The aqueous solution of lanthanide citrate is typically prepared by using an excess, typically 1.5- to 20-fold, such as 2- to 10-fold, for example 2.2- to 8-fold, in particular 2.5- to 5-fold molar excess, of citric acid, which means that manganese citrate can readily be formed into the solution-after the dissolution of the lanthanide into the solution as a citrate complex-without the addition of further citric acid.

Surprisingly, it has been found that the presence of lanthanide in the aqueous phase will contribute to stabilization of the present aqueous solutions.

One embodiment applicable both to the second and the third solutions comprises preparing a supersaturated solution of Mn(II) citrate, having a pH of less than 8, in particular less than 7, such as less than 6, such as less than 5.5 or less than 5.

As discussed above, the molality the alkaline earth metal, such as calcium, of the aqueous solution is preferably about 0.5 to 2.5, or 0.6 to 2, or 0.7 to 1.8, or 0.8 to 1.6, or about 1±0.25.

An aqueous solution as disclosed herein can be used as an aqueous precursor solution for preparing a thin film, in particular an epitaxial thin film, by chemical solution deposition.

Typically, the precursor solution is applied by suitable technology, for example by dip coating, aerosol deposition, inkjet printing, 3D printing, roll-on-roll transfer or spin-coating, on a substrate to form a layer, which is then dried and thermally treated to remove elements that do not take part in the forming of the target complex oxide, such as hydrogen, carbon, nitrogen and oxygen. Further methods of applying the present precursor solutions onto a substrate include tape-casting, press printing, screen printing, offset printing, and flexographic printing.

According to an embodiment, the aqueous solution is used for preparing a thin film onto a substrate, and the substrate has been rendered hydrophilic prior to the preparation of the thin film.

The substrate can for example be pre-treated with piranha solution to make the substrate hydrophilic and to remove any organic residues from the substrate before applying the precursor solution to the substrate. Alternatively, a plasma cleaner can be used for said pre-treatment, i.e. the substrate has been rendered hydrophilic by plasma treatment. A plasma cleaner can indeed be used for high speed etching applications and surface treatment. With an $H_2O$ option the system can be used to hydrophilize substrate surfaces by adding OH-radicals on the surface of material. The method is relatively fast and does not create extra materials that needs to be disposed of. Therefore, the use of plasma cleaner for hydrophilization of surfaces is highly environmentally friendly method as opposed to traditional piranha treatment.

Finally, the film is typically subjected to annealing to allow for crystallization of the thin film. The films can be subjected to etching, sputtering or lithography such as UV lithography or EUV lithography.

The annealing may also comprise two steps, a first thermal treatment followed by annealing itself (second thermal treatment).

In one embodiment, the (first) thermal treatment is carried out by increasing the temperature of the material from ambient (room temperature) up to a target temperature of typically at least 150° C., in particularly at least 200° C., such as at least 250° C. or at least 300° C., for example about 350° C. or for example about 400° C., and annealing (a second thermal treatment) is carried out by increasing the temperature of the material—typically obtained after the first thermal treatment as explained above—from ambient (or room temperature) up to a target temperature of at least 400° C., 450° C., 500° C., 600° C., 700° C., 750° C., 800° C., 850° C., 900° C., 950° C., 1000° C., 1100° C. or 1200° C. In both thermal treatment and in annealing, the ramping up of the temperature from room temperature to the target temperature will extend over a period of time of 1 to 24 hours, typically 4 to 16 hours, such as 6 to 14 hours. Extended periods of temperature ramping will contribute to the formation of films which have an even surface. Similarly, using the lowest possible temperatures for each step is preferable, to ensure good quality of the final film.

In one embodiment, the temperature is increased at a rate of approximately 0.1 to 5° C., or 0.2 to 3° C., for example 0.3 to 1.5° C., or 0.4 to 1° C., such as about 0.5° C./min, wherein a rate of less than 0.5° C./min may be preferred to avoid damaging the substrate surface. The temperature can be increased over a period of time of 1 to 24 hours, or 2 to 20 hours or 4 to 16 hours, such as 6 to 14 h, up to a target temperature in the range of, e.g., about 300 to about 600° C., or 300 to 580° C., or 300 to 450° C., and then the thus treated object is kept at the target temperature for 1 to 10 h, after which it is allowed to cool down passively.

In one embodiment, annealing is carried out in air or in oxygen atmosphere at a temperature in the range of 600 to 1200° C., for example at about 750° C. Some examples of suitable temperature ranges for annealing are 600-1000° C., 700-1200° C., 750-1000° C., 600-800° C. and 600-750° C. The temperature suitable for annealing may depending on the method of chemical deposition, as for example spin coating typically makes a thinner layer than for example dip coating. Thus if dip coating is sued, either a higher temperature, a lower temperature increase rate and/or a longer retention time at the target temperature is needed than for spin coating. The same may apply to inkjet printing and roll-on-roll transfer.

In one embodiment, the present aqueous precursor solutions are suitable for use in the production, by chemical solution deposition, of a material having Formula I $$R_{1-x}A_xMnO_3 \qquad \text{I}$$

wherein

R stands for a lanthanide, in particular Eu, Gd, Tb, Sm, Pr, La and Nd and combinations thereof, A stands for an alkaline earth metal, and x has a value in the range from 0.5 to 1.0, for example 0.55-1.0, 0.6-1.0, 0.65-1.0, 0.7-1.0 or 0.75-1.0; or 0.5 to 0.99, such as 0.55-0.99, 0.6-0.99, 0.65-0.99, 0.7-0.99 or 0.75-0.99; preferably x has a value in the range from 0.5 to 0.95, such as 0.55-0.95, 0.6-0.95, 0.65-0.95, 0.7-0.95 or 0.75 to 0.95 or 0.75 to 0.9, said material preferably being crystalline.

In one embodiment, the aqueous precursor solution is used for preparing thin films having a thickness of 20 to 2000 nm, such as 25 to 1000 nm, for example 30 to 750 nm, or 40 to 700 nm, or 50 to 500 nm and optionally comprising a plurality of overlapping layers having an individual thickness of at least 1 nm, or at least 1.5 nm, or at least 2 nm, or at least 2.5 nm or at least 3 nm or at least 4 nm, or at least 5 nm and up to 30 nm, or up to 25 nm, or up to 20 nm, or up to 15 nm, or up to 10 nm. By overlapping in this context is meant layers that are at least one on top of another. In other words, one or more of the layers may be larger than one or more of the other layers, but mainly the layers are covering each other.

As apparent, the present technology provides for the manufacture of thin films having the above Formula I wherein R stands for a lanthanide, in particular Eu, Gd, Tb, Sm, Pr, La and Nd, A stands for an alkaline earth metal, in particular calcium, barium or strontium, and x has a value in the range from 0.5 to 1.0, for example 0.55-1.0, 0.6-1.0, 0.65-1.0, 0.7-1.0 or 0.75-1.0; or 0.5 to 0.99, such as 0.55-0.99, 0.6-0.99, 0.65-0.99, 0.7-0.99 or 0.75-0.99; preferably x has a value in the range from 0.5 to 0.95, such as 0.55-0.95, 0.6-0.95, 0.65-0.95, 0.7-0.95 or 0.75 to 0.95 or 0.75 to 0.90.

Further, in one embodiment, an epitaxial thin film having the Formula I, wherein R stands for a lanthanide, in particular Eu, Gd, Tb, Sm, Pr, La and Nd, A stands for an alkaline earth metal, such as calcium, barium or strontium, and x has a value in the range from 0.6 to 0.95, or 0.75-0.90, is deposited onto a substrate for providing a memristor.

In a fifth aspect, the present description relates to a method for manufacturing a thin film on a substrate, comprising providing the substrate;

rendering the substrate hydrophilic; and preparing the thin film by chemical solution deposition of the aqueous solution as described herein.

The different embodiments and variants described herein apply mutatis mutandis to the method for manufacturing a thin film on a substrate.

Memristor structures, in which the present films can be used, are exemplified by the embodiments of the attached drawings.

FIG. 1 is a schematic cross section of a memristor, which here is of the so-called planar type. The memristor comprises a piece of memristor material 1 that constitutes a memristive connection between a first contact 2 and a second contact 3. The expression "memristor material" is used here for the purpose of unambiguously referring to the material that appears between the contacts, although it is the current understanding that the memristor-type effects actually arise in the junction or interface between the memristor material and the contact, not in the bulk of the memristor material itself.

Electrically conductive connections couple the first and second contacts 2 and 3 to respective nodes 4 and 5, which can be used to subject the piece of memristor material 1 to desired voltages and to measure the resulting electric characteristics of the piece of memristor material 1.

The piece of memristor material 1 constitutes a film on top of a substrate 6. In a memristor of the planar type, such as the one shown in FIG. 3, the piece of memristor material 1 can be deposited in the form of a film directly on the surface of the substrate 6, but this is not a requirement; intermediate layers of desired materials can be used therebetween if they are advantageous for example for achieving better compatibility between crystal structures of the various materials involved.

Figure 2:
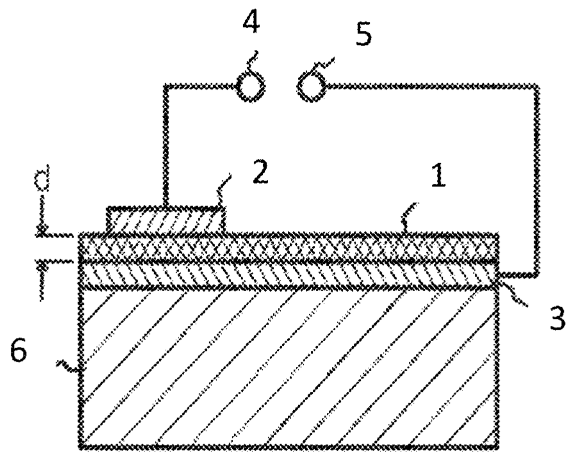
FIG. 2 shows a schematic cross-section of a memristor of a transversal type.

FIG. 2 is a schematic cross section of a memristor, which here is of the so-called transversal type, sometimes also referred to as the capacitor type. Also in this case the piece of memristor material 1 constitutes a memristive connection between a first contact 2 and a second contact 3, and electrically conductive connections couple these to nodes 4 and 5, respectively. The piece of memristive material 1 constitutes a film that is on top of the substrate 6, but not directly on top thereof because the second contact 3 constitutes a layer therebetween. A memristor of the transversal type, such as the one shown here, has certain advantageous features in comparison with the planar type of FIG. 1: for example, it may require lower operating voltages. However, its manufacturing also requires more steps than the manufacturing of a memristor of a planar type.

Figure 3:
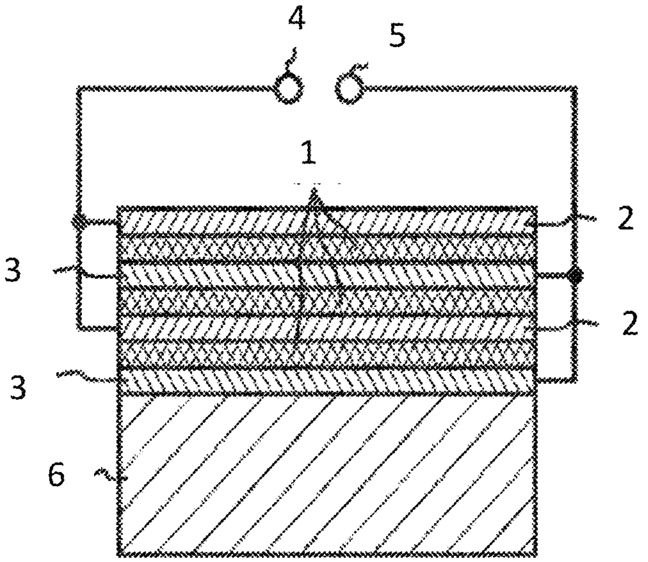
FIG. 3 shows a schematic cross-section of a memristor of a multi-layer type.

FIG. 3 is a schematic cross section of a memristor of the multilayer type. In this case there are two or more pieces of memristor material 1, each of which may be sandwiched between other layers. In the exemplary structure shown in FIG. 3 the intermediate layers are layers of the first and second contacts 2 and 3, so that each piece of memristor material 1 has a first contact layer on its one side and a second contact layer on its other side in the transversal direction, i.e. the direction perpendicular to the surface of the substrate 6.

In all these embodiments where the piece of memristive material constitutes a film on top of a substrate, a thickness d of the film in the direction perpendicular to the surface of the substrate may be for example between 1 and 500 nanometres, or in one preferred embodiment between 10 and 100 nanometres, such as 20 to 80 nanometres. The thickness d of the film does not need to be constant across its whole area, but a constant thickness of the film can readily be reached with chemical solution deposition using the present precursor solutions.

The first and second contacts 2 and 3 may be made of the same material, or they may be made of different materials. Saying that a contact is made of a particular material is synonymous with saying that the respective contact consists predominantly of that material, to the extent that the characteristics of that material dominate the effects that are observed at the interface between the contact and the piece of memristive material.

In a number of embodiments that have been found to exhibit interesting characteristics the first and second materials are different materials. In particular, it has been found that the memristor may exhibit certain interesting characteristics if the rectifying properties of the junction between the first material and the memristive material are different from the rectifying properties of the junction between the second material and the memristive material.

An example of a material that can be used as the first material is aluminium. Other examples of materials that can be used as the first material exist as well, and include but are not limited to titanium.

Examples of materials that can be used as the second material are gold and silver. Other examples of materials that can be used as the second material exist as well, and include but are not limited to copper, platinum, palladium, indium, and $SrRuO_3$.

A typical property of a memristor is that its current-conducting properties depend on the electric conditions it has been previously subjected to. Memristors can be "programmed" to have a certain resistance value by applying a "write" pulse of a certain amplitude.

Even more interesting are memristors that have a linear or log-linear response to write pulses of different amplitudes. This concept is described in more detail in WO 2021/152215 A1, the content of which is herewith incorporated by reference.

For applications of GCMO in microchip device manufacturing, it is preferred to be able to pattern the films. In embodiments of the present technology, a straightforward procedure comprises wet chemical etching of GCMO thin films carried out as part of a photolithography process. To that aim, aqueous etchant compositions containing e.g. hydrochloric acid and potassium iodide along with an anti-oxidant, such as ascorbic acid, can be used. Typically, the concentration of the hydrochloric acid is about 0.05 to 0.15 M, of the potassium iodide about 0.5 to 5 M and of the ascorbic acid 0.01 to 2.5 M. Preferably, the concentration of hydrochloric acid is about 0.12 M, the concentration of potassium iodide is about 5 M and the concentration of ascorbic acid is about 0.1 M.

The following non-limiting examples illustrate further embodiments of the present technology.

EXAMPLES

Example 1. Preparation of the Precursor Solutions for GCMOs

Stock solutions were prepared to give precursor solutions with the desired value of x in Formula II of the metal oxide of the intended thin film:

$$Gd_{1-x}Ca_xMnO_3 \quad (II)$$

The precursor solution for a metal oxide in which x is 0.95, is referred to as "GCMO95", whereas a precursor solution of a metal oxide in which x is 0.75 is referred to as "GCMO75".

The starting materials and reagents and their amounts are shown in Table 1.

TABLE 1

Masses (in g) and volumes (in mL) of the reagents required for preparing 25 mL of each stock solution

| Solution | $m(H_3Cit•H_2O)$ | $m(MnO_2)$ | $m(Gd_2O_3)$ | $m(Ca(NO_3)_2•4H_2O$ | $V(H_2O_2)$ | $V(NH_3)$ |
|---|---|---|---|---|---|---|
| GCMO95 | 6.8101 | 2.6833 | 0.2797 | | 4.0 | 3.6 |
| GCMO75 | 7.7257 | 2.5571 | 1.3327 | | 3.8 | 3.4 |
| Ca stock | | | | 29.51875 | | |

1.1 Preparation of a Calcium Stock Solution

A 5M $Ca(NO_3)_2$ solution was prepared by dissolving $Ca(NO_3)_2·4H_2O$ in deionized water and carefully filtered to remove any traces of solid impurities. For the mass of $Ca(NO_3)_2·4H_2O$, see Table 1.

1.2 Preparation of the Stock Solutions of GCMO95 and GCMO75

25 mL of two stock solutions corresponding to the compound of Formula II wherein x=0.95 and 0.75, respectively, were prepared. The starting materials and reagents are shown in Table 1.

$H_3Cit$ was dissolved in approx. 200 mL deionized water in a large beaker (500 mL). The weighed amount of $Gd_2O_3$ was added. Hotplate was set to 125-150° C. and upon standing (approx. 6 hours) all oxide had dissolved, resulting in a completely clear, colourless solution. The solution was allowed to cool to room temperature and then diluted to 300 mL. Then $MnO_2$ was added followed by drop-wise addition of the $H_2O_2$ solution (resulting in evolution of oxygen gas) at room temperature. The solution was allowed to stand so as to become clear (approx. 12 hours). The solution had a generally peachy colour, likely due to presence of $Mn^{3+}$, while the solution with the higher concentration of gadolinium (x=0.75), had a stronger red hue. At this stage, the solution was supersaturated.

The pH of the clear solution was raised to approx. 8-9 by adding ammonia solution drop-wise. The solution darkened to take up a deep red colour, but remained clear. The solution now became stable and could be subjected to evaporation.

The solutions were then evaporated to a volume of less than 25 mL on a hotplate set to 75° C., yielding a solution temperature of approx. 50° C. (takes from 2 days up to a week).

Once the solution had cooled, the total volume was adjusted to 25 mL by adding deionized water and carefully filtered to remove any traces of solid impurities.

These stock solutions, referred to as GCMO95 and GCMO75 here, can be used as is for preparing thin films of GCMO with x=0.95 and x=0.75, respectively, after addition of appropriate amount of the Ca stock solution.

1.3 Mixing of GCMO95 and GCMO75 and the Ca Stock Solution to Obtain Precursors with Predetermined x The stock solutions can be mixed as shown in Table 2 to obtain precursor solutions having the predetermined x.

TABLE 2

Volumes (in mL) of the stock solutions required for preparing 1.0 mL of the GCMO precursor with predetermined *x*

| *x* | $V_{95}$ (mL) | $V_{75}$ (mL) | $V_{Ca}$ (mL) |
|---|---|---|---|
| 0.75 | 0.000 | 0.850 | 0.150 |
| 0.80 | 0.203 | 0.638 | 0.160 |
| 0.85 | 0.405 | 0.425 | 0.170 |
| 0.90 | 0.608 | 0.213 | 0.180 |
| 0.95 | 0.810 | 0.000 | 0.190 |

Example 2. Spin Coating on Substrate of Precursor Solutions

The procedures discussed above were further tested by preparing precursors with x=0.75, 0.85 and 0.95 from GCMO95, GCMO85 and GCMO75 and calcium stock solutions. Thin films of these precursors were coated on 5 mm×5 mm $SrTiO_3$ (STO) substrates using the following procedure:

The substrates were cleaned and made hydrophilic by sulphate piranha treatment.

Spin coating of the solution onto the STO substrate was carried out at 5000 rpm (accelerated at 3000 rpm/s) in air.

Drying and pyrolysis were combined in an oven. First the temperature was ramped up from room temperature to 350° C. at approx. 0.5° C./min over 12 h, then coated substrate was maintained at 350° C. for 3 h, and then cooled to room temperature passively.

Annealing of the coated substrates was carried in a furnace at 900° C. for 24 in oxygen to allow for crystallization of the GCMO.

Example 3. Spin Coating on Substrate of Precursor Solutions

Example 2 was repeated except that the annealing was carried out in a furnace at 750° C. for 24 in oxygen to allow for crystallization of the GCMO.

Example 4. Etching GCMO

The GCMO obtained in Example 3 was etched by wet chemical etching as part of a photolithography process. The etchant was based on chloride reducing the manganese to the water-soluble manganese (II) under acidic conditions in presence of iodide facilitating the reduction of the elemental chlorine formed back to chloride, thus providing a way to regulate the speed of the process. The following aqueous etchant composition was used $$[HCl] = 0{:}12\ M;\ [KI] = 5\ M;\ [\text{Ascorbic acid}] = 0{:}1\ M$$

Ascorbic acid was added to prevent oxidation of iodide which leads to the solution becoming opaque. A 1:1 dilution of the etchant yielded etch times of 1-2 min depending on the film.

Results

Figure 5A:
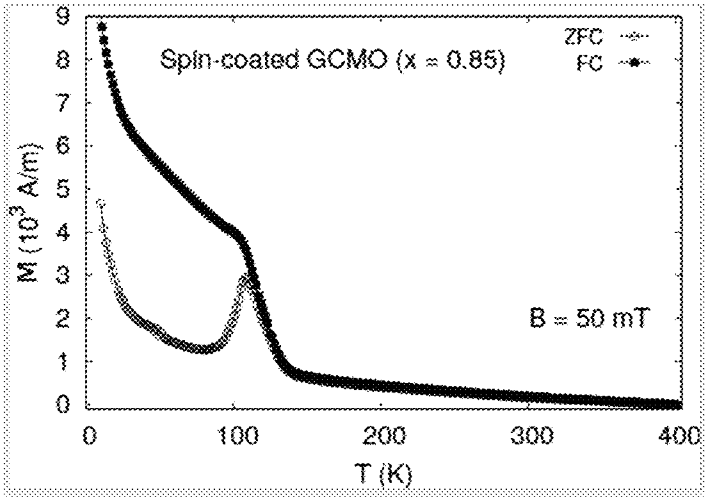
FIGS. 5A and 5B show the temperature dependence of the zero-field-cooled (ZFC) and field-cooled (FC) magnetizations M measured in 50 mT field at temperatures from 10 to 400 K for two spin-coated GCMO thin films with different calcium concentrations.
Figure 5B:
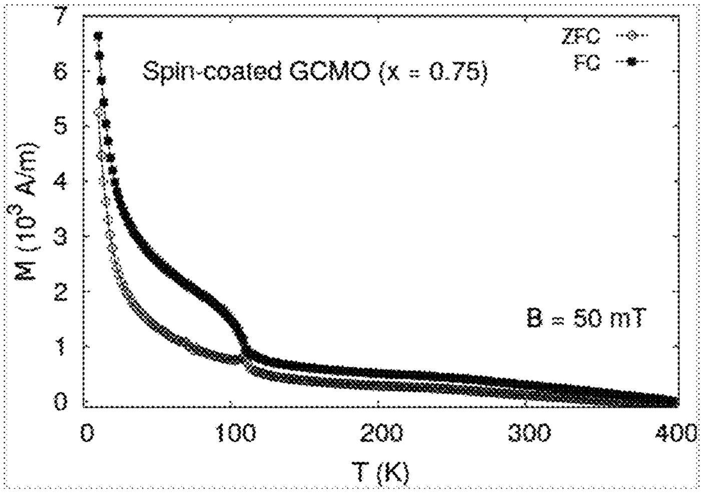
Figure 6A:
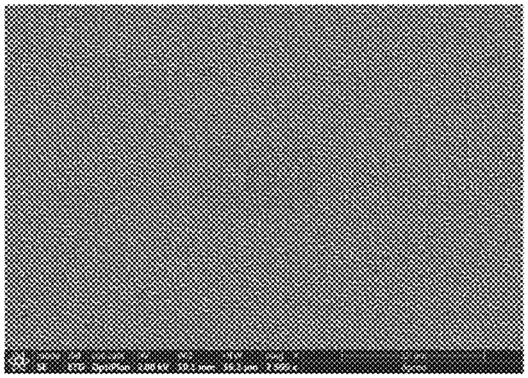
FIGS. 6A and 6B are SEM images of the surface of the GCMO film with x=0.75 prepared by CSD in Example 2.
Figure 6B:
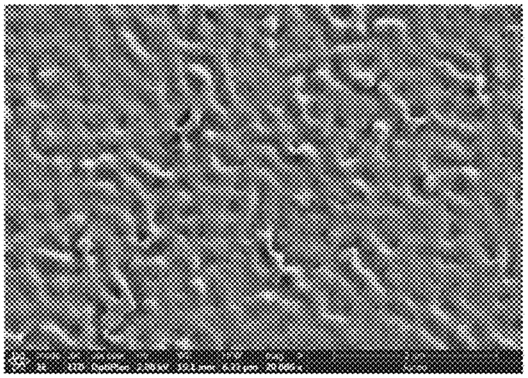

Experimental verifications of film quality for two different x-values (0.75 and 0.85, respectively) were carried out by XRD analysis (cf. FIGS. 4A to 4D), by magnetic measurements (cf. FIGS. 5A and 5B), and by SEM for film smoothness and thickness (FIGS. 6A and 6B). An evaluation of memristive properties was also carried out (FIG. 7).

a. XRD Analysis

Figure 4A:
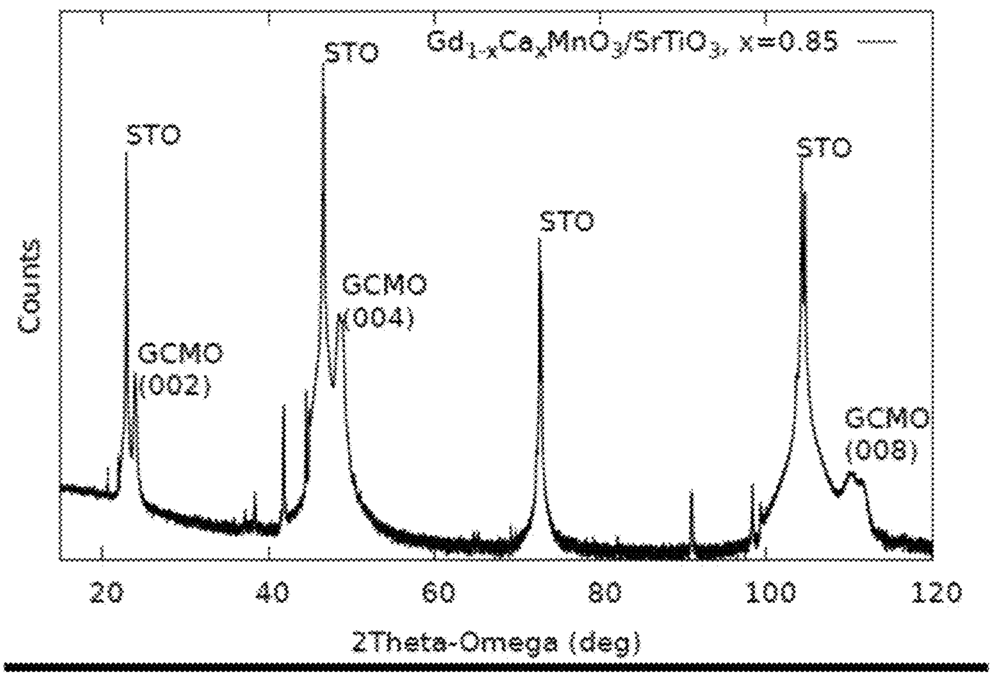
FIGS. 4A to 4D show XRD results that demonstrate c-axis oriented and textured GCMO phase.

Microstructural attributes were characterized with PanAnalytical Empyrean X-ray diffractometer with five axis goniometer. Diffractometer was utilized with Empyrean Cu LFF HR x-ray tube. The x-ray radiation was filtered to consist mainly of Cu Kα1 and Kα2 x-rays. The incident beam optics consisted of Bragg-Brentano HD x-ray mirror, fixed ¼° divergence slit, 5 mm mask, 0.04 rad soller slit and 1° antiscatter slit. The diffracted beam optics consisted of 7.5 mm divergence slit, 0.04 rad soller slit and PIXcel detector array. θ–2θ results presented in FIG. 4A show (001) peaks both from $SrTiO_3$ substrate and GCMO film. Peak identification is based on (ICSD 12626). Please note that the indexing of b and c parameter has been switched. This is due to convenient labelling.

Figure 4B:
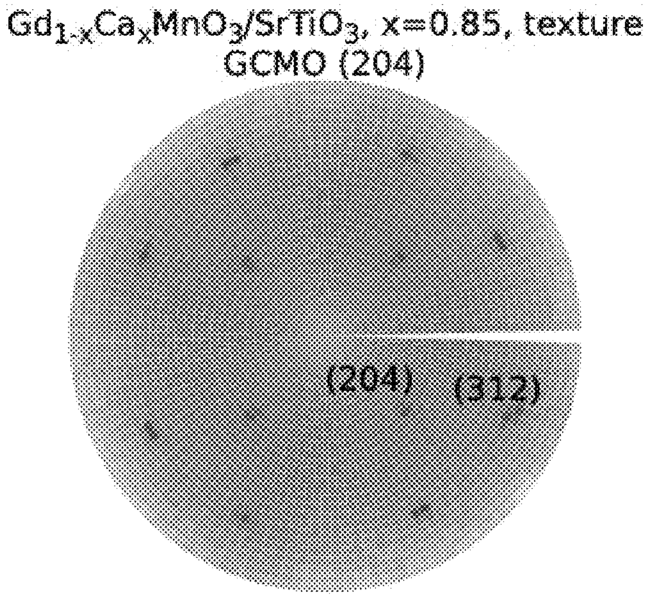

Pole figure obtained from GCMO (204) peak is presented in FIG. 4B.

Figure 4C:
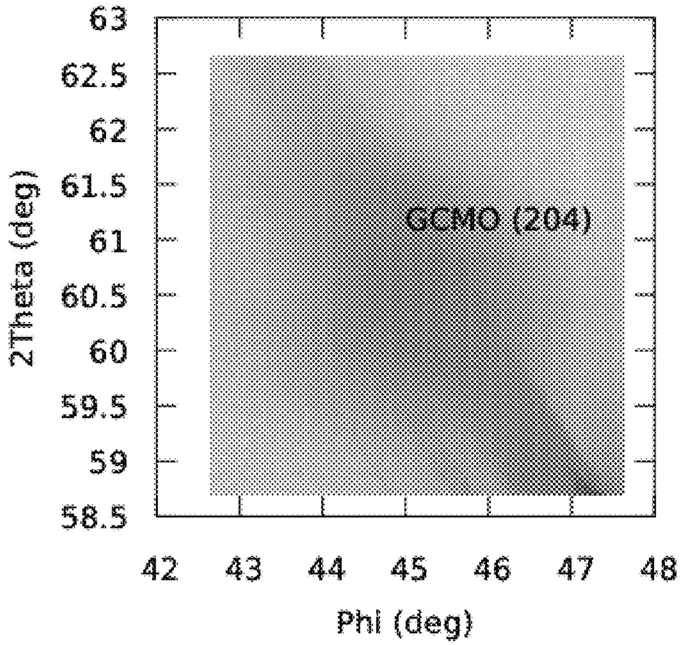
Figure 4D:
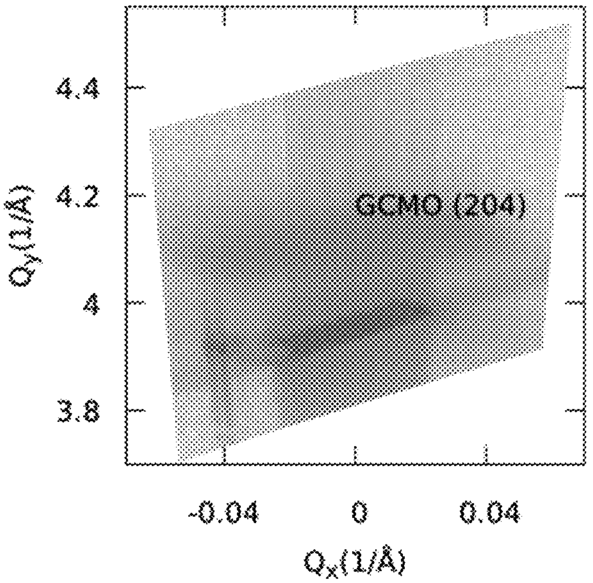

This is supported by the detailed data shown in FIG. 4C θ–φ and FIG. 4D ω–2θ scans of GCMO (204) peak. These results show that the films are epitaxial, phase-pure and fully c-axis oriented.

b. Magnetic Measurements

The magnetic transitions of the spin-coated GCMO thin films with the Ca concentrations of X=0.75 and x=0.85 were studied by measuring the zero-field-cooled (ZFC) and field-cooled (FC) magnetizations M in the temperature range of 10-400 K and in 50 mT external magnetic field, as shown in FIGS. 5A and 5B.

FIGS. 5A and 5B show the temperature dependence of the zero-field-cooled (ZFC) and field-cooled (FC) magnetizations M measured in 50 mT field at temperatures from 10 to 400 K for two spin-coated GCMO thin films—FIG. 5A for a GCMO film with x=0.75 and FIG. 5B for a GCMO film with x=0.85—with different calcium concentrations. As will appear, a complex magnetic behaviour with the mixture of competing ferromagnetic (FM) and antiferromagnetic (AFM) states is available, where the existence of the peak in ZFC curve below Curie temperature can be attributed to the spin-glass or cluster-glass behaviour. The magnetic ordering temperatures are comparable with the results observed for GCMO ceramic bulks as well as for GCMO thin films ablated by pulsed laser deposition (PLD) with the same Ca doping concentrations although the paramagnetic (PM) increase in MT curves at low temperature seems to be stronger in spin-coated thin films than in films prepared by PLD.

c. Surface Properties

Film smoothness and thickness are shown in FIGS. 6A and 6B for the film prepared according to Example 2. The Figures show Scanning Electron Microscope (SEM) images of the x=0.75 film and demonstrate that while the film surface is not atomically smooth (during pyrolysis, exhaust gases escape from the film; generally CSD is not a suitable technique for extremely smooth films), the film surface is still smooth enough for microelectronics manufacture.

Furthermore, an etching procedure, of the kind described above, comprising etching stripes into the x=0.75 film was carried out. A rough measurement of the film thickness was obtained by measuring the thickness of the stripes using an Atomic Force Microscope (AFM).

The result was that with the undiluted precursor, a film thickness of ~100 nm was obtained.

Figure 7A:
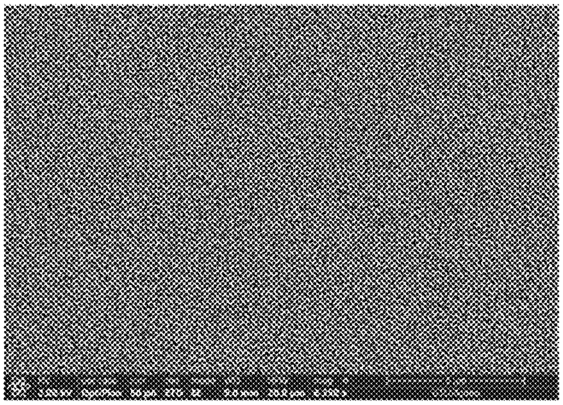
FIGS. 7A and 7B are SEM images of the surface of the GCMO film with x=0.75 (FIG. 7A) and x=0.95 (FIG. 7B) prepared by CSD in Example 3.
Figure 7B:
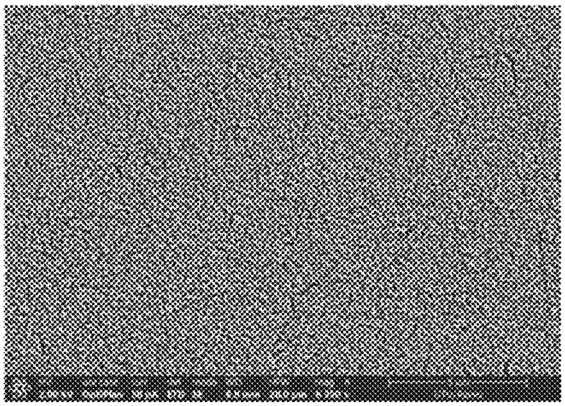

FIGS. 7A and 7B illustrate film smoothness and thickness for the film prepared according to Example 3. FIG. 7A is a SEM image of the x=0.75 film and FIG. 7B a SEM image of the x=0.95 film. Again, it can be seen that the surfaces have a smoothness that is suitable for microelectronics manufacture. The thickness measured as described above was also ~100 nm.

d. Memristive Properties

To verify that the GCMO films prepared using CSD described above exhibit memristive switching, a crude planar memristor was built on the GCMO film with x=0.85 by depositing spots of gold thin film to be used as the cathode (it has been shown that gold makes an ohmic contact with GCMO and thus does not yield memristive behaviour).

Aluminium wire contacts were made using a wire bonder to the gold cathode (this is also an ohmic contact), and directly to the GCMO film to provide the anode (it is this interface between the aluminium and the GCMO that functions as the memristor).

The planar memristor was then connected to a Keithley 2614B SourceMeter, and a pulsed voltage sweep from U=−12 V to U=+12 V was performed 5 times to investigate its memristive switching behaviour. The pulses had a width of 50 ms, and frequency of approximately 7 Hz.

Figure 8:
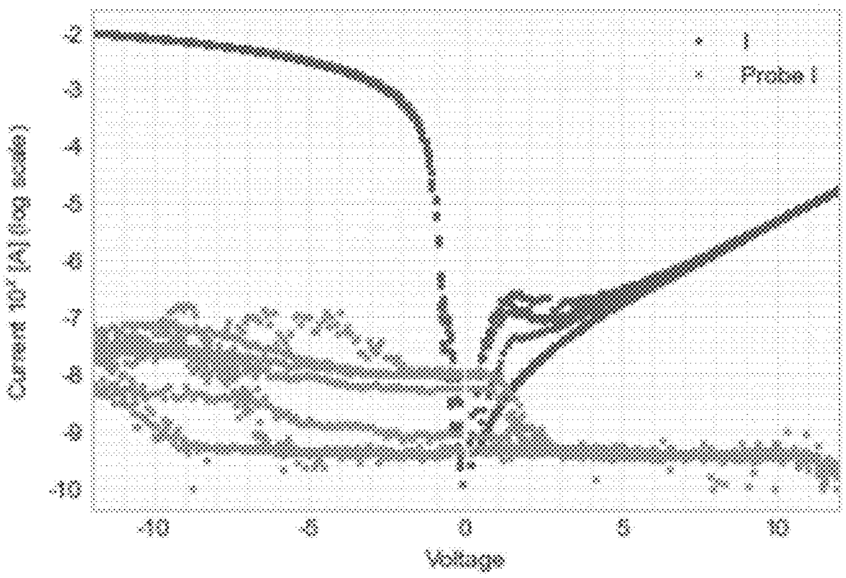
FIG. 8 shows an IV-plot of 5 pulsed sweeps performed on a planar memristor constructed using a GCMO-film prepared using CSD as described above, with x=0.85.

FIG. 8 shows the current measured with each pulse. Half way through each pulse, the memristor was probed at 0.4 V, and the probe currents are also shown in the Figure.

While this is only a crude demonstration, it can clearly be seen from the multivalued nature of the current I(V) as a function of voltage that the sample has a resistance depending on the history of the voltages it has been subjected to, that this sample exhibits memristive switching. In particular, the sample exhibited resistive switching, which is the defining characteristic of a memristor.

INDUSTRIAL APPLICABILITY

Complex metal oxide materials and complex metal oxide films provided by the present technology find use as memristors and parts thereof as well as, generally, in microelectronic, magnetic, and spintronic devices, in solid oxide fuel cells, in magnetic refrigeration, in the fields of biomedicine, and as catalysts. The films can be used in memory components, transistors, integrated circuits and other components and apparatuses conferring new functionality thereto. The present precursor solutions can be used together with suitable compositions and compounds of synthetic or natural minerals, such as hackmanites, zeolites, scapolites or tugtupites.

The invention claimed is:

1. An aqueous solution comprising:
- an alkaline earth metal in the form of a water-soluble salt, and
- manganese, at least mainly present as a citrate complex of manganese having an oxidation state of +3 and/or +4,
- the aqueous solution exhibiting a molality of 0.1 to 5 with respect to the alkaline earth metal.

2. The aqueous solution according to claim 1, further comprising a lanthanide present in the form of a water-soluble complex.

3. The aqueous solution according to claim 1, comprising, based on the total weight of the aqueous solution:
- 0.5 to 40%, by weight of the water-soluble alkaline earth metal salt,
- 0.5 to 20%, by weight of the manganese, calculated as $MnO_2$, and
- 0.1 to 15%, by weight of a lanthanide, calculated as an oxide of the lanthanide.

4. The aqueous solution according to claim 1, wherein the alkaline earth metal is selected from the group consisting of calcium, barium, strontium, and combinations thereof, and wherein the alkaline earth metal is in the form of a nitrate or an acetate.

5. The aqueous solution according to claim 1, comprising an Mn(III) or Mn(IV) citrato complex with, on average, one citrato ligand per Mn cation.

6. The aqueous solution according to claim 1, further comprising a lanthanide in the form of a citrate complex.

7. The aqueous solution according to claim 1, comprising a water content of 40 to 80% by mass.

8. The aqueous solution according to claim 1, having a pH of 7 or more.

9. The aqueous solution according to claim 1, wherein the molality is 0.5 to 3.

10. The aqueous solution according to claim 1, wherein the aqueous solution is essentially free from free citrato ligands.

11. A method of preparing an aqueous solution comprising:
- providing a first aqueous solution of a water-soluble salt of an alkaline earth metal;
- providing at least one of the following:
  - a second aqueous solution of a citrate complex of manganese having an oxidation state of +3 and/or +4, or
  - a third aqueous solution containing a citrate complex of manganese having an oxidation state of +3 and/or +4 and a water-soluble complex of a lanthanide; and
- mixing the first and at least one of the second or third aqueous solutions at a predetermined ratio to provide said aqueous solution.

12. The method according to claim 11, comprising mixing the first aqueous solution with the second aqueous solution and of the third aqueous solution.

13. The method according to claim 11, comprising preparing the water-soluble complex of the lanthanide by:
- dissolving citric acid in water to form an aqueous solution of citric acid; and
- adding lanthanide oxide into the aqueous solution of citric acid to form the water-soluble complex of the lanthanide.

14. The method according to claim 11, comprising preparing the water-soluble complex of the lanthanide by:
- providing a lanthanide oxide;
- dissolving a molar excess of citric acid, compared to the lanthanide oxide into an aqueous solution;
- contacting the lanthanide oxide with citric acid until at least essentially all lanthanide oxide has dissolved; and
- increasing the pH of the aqueous solution in order to form a stable citrato complex of the lanthanide.

15. The method according to claim 11, comprising preparing the second aqueous solution and/or the third aqueous solution by:
- adding $MnO_2$ into an aqueous solution of citric acid;
- reducing Mn into Mn(II) in the aqueous solution of citric acid; and
- raising the pH of the aqueous solution of citric acid to at least 8 to form Mn(III) or Mn(IV) citrate or a combination thereof.

16. The method according to claim 15, wherein the reducing of the Mn comprises reducing Mn(IV) and/or Mn(III) into Mn(II) by using hydrogen peroxide, incorporated into the aqueous citric acid.

17. The method according to claim 15, further comprising adding ammonia to the aqueous solution of citric acid to deprotonate the citric acid and to oxidize manganese to Mn(III) or Mn(IV) or a combination thereof.

18. The method according to claim 15, wherein the aqueous solution of citric acid contains lanthanide citrate.

19. The method according to claim 18, wherein a lanthanide of the lanthanide citrate is selected from the group consisting of La, Ce, Pr, Nd, Sm, Eu, Gd, Tb, Dy, Ho, Er, Tm, Yb and Lu, and combinations thereof.

20. The method according to claim 11, further comprising producing a material having Formula I:

$$R_{1-x}A_xMnO_3 \quad (I)$$

wherein

R stands for the lanthanide,

A stands for the alkaline earth metal, and x has a value in the range from 0.5 to 1.0, said material preferably being crystalline, wherein the producing comprises chemical solution deposition of the aqueous solution.

21. The method according to claim 20, wherein the first and at least one of the second or third aqueous solutions are mixed at a ratio corresponding to x to provide said aqueous solution.

22. A method for manufacturing a thin film on a substrate, comprising:

rendering the substrate hydrophilic; and preparing the thin film by chemical solution deposition of the aqueous solution according to claim 1.

* * * * *